United States Patent Office 3,258,325
Patented June 28, 1966

3,258,325
HERBICIDAL METHOD
Francis E. Lawlor, Torrance, Calif., and Ivan C. Popoff, Ambler, Pa., assignors to Pennsalt Chemicals Corporation, Philadelphia, Pa., a corporation of Pennsylvania
No Drawing. Original application June 1, 1962, Ser. No. 199,262. Divided and this application May 21, 1964, Ser. No. 374,226
3 Claims. (Cl. 71—2.3)

This application is a division of application Serial No. 199,262, filed June 1, 1962, now abandoned.

This invention relates to novel compounds which are useful as agricultural chemicals particularly as plant response agents (e.g. herbicides) and as pesticides. In particular the invention deals with pentachlorobenzyl mercaptan and its salts.

In accord with this invention, there is provided compounds of structure $[C_6Cl_5CH_2S]_nM$ where M is an atom selected from the group of hydrogen, and a metal of Groups IA, IB, IIA, IIB, VIIA and VIIIA of the Periodic Table as set forth in the 1949 edition of "General Chemistry" by Harry N. Holmes, and $n$ in the above formula is an integer corresponding to the valence of M. Illustrative of metals represented by M are metals of Group IA (i.e. the alkali metal group) such as sodium, potassium, lithium and the like; metals of Group IB such as copper, silver, etc.; metals of Group IIA such as beryllium, magnesium, calcium, barium, etc.; likewise members of Group IIB such as zinc, cadmium and mercury; those metals of Group VIIA such as manganese; and the metals of Group VIIIA such as iron, cobalt, nickel, ruthenium, palladium, and the like.

The preparation of these compounds is relatively simple and is preferably carried out by first preparing the isothiuronium salt of pentachlorobenzyl mercaptan. This is accomplished readily by reacting a pentachlorobenzyl halide with thiourea, the reaction being carried out at temperature of about 50–100° C. in solvents having some solubility for both reactants. Generally the reaction solution is simply refluxed for a time sufficient to complete the reaction and then the precipitated crystalline product is filtered off. Solvents for the reaction are preferably alcohols, such as methanol, ethanol, and isopropanol. Other useful solvents for the reaction are ketones such as acetone and methyl ethyl ketone and ethers such as di-isopropyl ether and the like. The isothiuronium salt thus formed is converted to the free mercaptan simply by hydrolyzing it with alkali, such as sodium hydroxide to first convert it to the alkali metal salt of the pentachlorobenzyl mercaptan and then the mercaptan is precipitated by neutralizing the alkali metal salt with acid. The pentachlorobenzyl mercaptan may be converted to any one of its Group IIA, IIB, VIIA and VIIIA metal salts by reacting a water-acetone solution of the mercaptan with a water soluble metal salt whereby the insoluble metal pentachlorobenzyl mercaptide compound is precipitated from solution.

Alternatively the pentachlorobenzyl mercaptan may be obtained directly by reaction of pentachlorobenzyl chloride with sodium hydrosulfide in alcohol and under conditions of heat and pressure. In either reaction, yields are good, being of the order of about 90%.

The pentachlorobenzyl mercaptan of this invention is a white crystalline product melting between 90 and 95° C. and is insoluble in water, but is soluble in hydrocarbon solvents such as hexane and benzene, acetone, ether and ethanol. The salts of pentachlorobenzyl mercaptan which comprise part of this invention are generally insoluble in water and organic solvents and decompose at temperatures in excess of 200° C. Unless the metal ion has a characteristic color the salts are also colorless materials.

The novel compounds of the present invention are particularly useful as agricultural chemicals and are of interest as pesticides, particularly as nematocides, and as plant response agents acting as herbicides. In application to agricultural products the compounds may be applied as dusts or as powder compositions, whereby they are admixed with such materials as talc, pearlite, various clays, fuller's earth, diatomaceous earth and the like. The products are applied to plants with the usual standard applicators using standard techniques. For spray applications the compounds may be dispersed in water or other suitable liquid and carriers may be added with or without wetting agents such as sulfated alcohols, alkylated aromatic sulfonic acids, amino soaps, and the like. Where adherence properties need to be improved, gums such as karaya gum may be added to increase the adherence of the composition to the foliage. The amount to be used in applying to the plant is dependent upon the nature of the plants to be controlled, the time of the year, the surrounding vegetation, the presence or absence of other materials such as surface active agents, diluents, carriers, and the like, and the amount of finish spray or dust to be applied per acre. No general rule can be set up since each case presents individual problems, but it may be stated that these materials are active in very small amounts and that there is little or no deleterious effect due to unusually large concentrations. The following examples will serve to further illustrate the nature of the invention.

*Example 1.—Preparation of pentachlorobenzyl mercaptan*

A mixture of 600 g. (2 moles) of pentachlorobenzyl chloride and 152 g. (2 moles) of thiourea were refluxed and stirred for two hours in 8 liters of isopropyl alcohol. The reaction mixture was filtered at room temperature and the filter cake was washed with methanol and dried at about 100° C. to obtain 677 g. (90% yield) of crude, S-pentachlorobenzylisothiuronium chloride having a melting point of 284–287° C. with decomposition. The product was recrystallized from 95% ethanol after which it melted with decomposition at 286–287° C.

A mixture of 100 g. (0.267 mole) of S-pentachlorobenzylisothiuronium chloride and 43 g. (1.07 moles) of sodium hydroxide was stirred in 3 liters of water for 3 hours at 85 to 90° C. The hot reaction mixture containing the sodium salt of pentachlorobenzyl mercaptan was filtered and the filtrate was acidified with dilute sulfuric acid. A precipitate formed and was filtered, washed with water and dried to obtain 68 g. (86% yield) of pentachlorobenzyl mercaptan having a melting point of 92–94° C. The pentachlorobenzyl mercaptan product was insoluble in water but soluble in hexane, acetone, benzene, ether and ethanol. After recrystallization from 95% ethanol the product melted at 92–94° C. and analyzed as follows—

Found: 28.49% C, 1.32% H, 59.31% Cl, 10.50% S.
Calculated: 28.36% C, 1.02% H, 59.81% Cl, 10.82% S.

*Example 2.—Preparation of zinc pentachlorobenzyl mercaptide*

A warm solution (35–40° C.) of 16.3 g. (0.075 mole) of zinc acetate dihydrate in a mixture of 70 cc. of water, 200 cc. of acetone and 2 cc. of acetic acid was added to a warm solution of 44 g. (0.148 mole) of pentachlorobenzyl mercaptan in 500 cc. of acetone. A precipitate formed which was filtered, washed with acetone and dried to obtain 45 g. (92.5% yield) of zinc pentachlorobenzyl mercaptide. This product was a white crystalline material which decomposed at 280–285° C. It analyzed as follows—

Found: 26.0% C, 1.0% H, 9.5% S, 53.4% Cl, 10.9% Zn. Calculated: 25.6% C, 0.6% H, 9.7% S, 54.0% Cl, 10.9% Zn.

*Example 3.—Preparation of mercuric pentachlorobenzyl mercaptide*

A solution at about 30–40° C. of 24 g. (0.075 mole) of mercuric acetate in a mixture of 50 cc. of water, 50 cc. of acetone and 2 cc of acetic acid was added to a 35–40° C. solution of 44 g. (0.148 mole) of pentachlorobenzyl mercaptan. The precipitate which formed was filtered, washed with acetone and dried to obtain 50 g. (85% yield) of mercuric pentachlorobenzyl mercaptide. The product was a white crystalline material which decomposed at 245–250° C.

EVALUATION AS AGRICULTURAL CHEMICALS

*Example 4.—Nematocidal effects of pentachlorobenzyl mercaptan and its salts*

An emulsion of pentachlorobenzyl mercaptan at 5% concentration in isophorone was prepared and this formulation used to treat soil containing *Panagrellus redivividus*. The amount of active agent in the soil was 0.25 g. per quart jar of infested soil. The treated soil was removed from the jar and planted with crops in a greenhouse. It was observed that a 25–50% kill of the organism was obtained.

When the above test is performed with silver and mercury salts of pentachlorobenzyl mercaptan good nematocidal activity is likewise obtained.

*Example 5.—Herbicidal effects of compounds*

A wettable powder formulation of the active agent was prepared using clay as a carrier and an anionic wetting agent to contain 10% by weight of the active agent. A soil surface in flats in a greenhouse was treated with this wettable powder at a rate of 10 pounds per acre and the soil was then planted with weed seed and crop. The following table indicates typical results obtained:

TABLE I.—PRE-EMERGENCE HERBICIDAL EFFECTS
[Rate of application—10 lbs. per acre]

| Agent | Pre-Emergence Weed | Percent kill | Crop | Percent Emergence |
|---|---|---|---|---|
| Pentachlorobenzyl mercaptan. | Foxtail | 45 | Sugar beet | 80 |
|  | Crabgrass | 55 | Cotton | 100 |
|  | Lamb's-quarter | 40 | Soybean | 100 |
|  | Purslane | 0 | Pea | 100 |
|  | Amaranthus | 0 |  |  |
| Zinc pentachlorobenzyl mercaptide. | Foxtail | 50 | Sugar beet | 68 |
|  | Crabgrass | 50 | Cotton | 60 |
|  | Lamb's-quarter | 65 | Soybean | 100 |
|  | Purslane | 35 | Pea | 100 |
|  | Amaranthus | 30 |  |  |

*Example 6*

A portion of the solution of Example 1 containing the sodium salt of pentachlorobenzyl mercaptan likewise shows herbicidal effects when evaluated by the technique of Example 5.

*Example 7*

The copper (II), calcium, manganese and iron (II) salts of pentachlorobenzyl mercaptan are prepared in accordance with the details of Example 2 and these salts likewise exhibit herbicidal effects when evaluated by the procedure of Example 5.

It will be understood that numerous variations and changes may be made from the above description and examples without departing from the spirit and scope of this invention.

We claim:

1. The process of obtaining pre-emergent herbicidal effects by contacting soil in which crops are planted, with a herbicidal amount of an agent having the structure

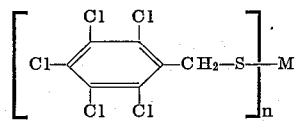

where M is an atom selected from the group consisting of hydrogen and a metal selected from the group consisting of zinc, sodium, copper, calcium, manganese and iron and $n$ is an integer corresponding to the valence of M.

2. The process of obtaining a pre-emergent herbicidal effect on weeds by contacting soil seeded with crops with a herbicidal amount of pentachlorobenzyl mercaptan.

3. The process of obtaining a pre-emergent herbicidal effect on weeds by contacting soil seeded with crops with a herbicidal amount of zinc pentachlorobenzyl mercaptide.

References Cited by the Examiner

UNITED STATES PATENTS

| 2,188,734 | 1/1940 | Carswell | 71—2.3 X |
| 2,965,535 | 12/1960 | Birum | 167—30 |
| 3,139,379 | 6/1964 | Miller | 167—42 |

OTHER REFERENCES

Thompson et al., Botanical Gazette, vol. 107, pages 475–507 (1946) (pages 491 and 499 particularly relied upon).

LEWIS GOTTS, *Primary Examiner*.

JAMES O. THOMAS, *Examiner*.